(12) United States Patent
Dunfee et al.

(10) Patent No.: US 11,351,512 B2
(45) Date of Patent: Jun. 7, 2022

(54) QUICK-CONNECT MIXER IMPELLER COUPLING

(71) Applicant: Siemens Healthcare Diagnostics Inc., Tarrytown, NY (US)

(72) Inventors: William D. Dunfee, Newark, DE (US); Jeffrey Taylor, Lincoln University, PA (US); Gregory D. Ariff, Newark, DE (US); Stephen Krufka, Newark, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 630 days.

(21) Appl. No.: 16/319,217

(22) PCT Filed: Jul. 19, 2017

(86) PCT No.: PCT/US2017/042904
§ 371 (c)(1),
(2) Date: Jan. 18, 2019

(87) PCT Pub. No.: WO2018/017742
PCT Pub. Date: Jan. 25, 2018

(65) Prior Publication Data
US 2019/0282981 A1    Sep. 19, 2019

Related U.S. Application Data

(60) Provisional application No. 62/365,183, filed on Jul. 21, 2016.

(51) Int. Cl.
*B01F 7/00* (2006.01)
*B01F 33/453* (2022.01)
(Continued)

(52) U.S. Cl.
CPC ........ *B01F 33/4533* (2022.01); *B01F 27/213* (2022.01); *B01F 33/453* (2022.01);
(Continued)

(58) Field of Classification Search
CPC .............. B01F 7/00725; B01F 13/0854; B01F 35/212; B01F 35/221422; B01F 27/213; F16D 1/10; B23B 31/28
See application file for complete search history.

(56) References Cited

U.S. PATENT DOCUMENTS 5,240,322 A * 8/1993 Haber ................. B01F 13/0827
206/219
6,264,360 B1 * 7/2001 Lehmusvaara ..... B01F 15/0048
266/262
(Continued)

FOREIGN PATENT DOCUMENTS

CN        1728508 A     2/2006
CN     201157765 Y    12/2008
(Continued)

OTHER PUBLICATIONS

PCT International Search Report and Written Opinion dated Sep. 28, 2017 (8 Pages).
(Continued)

*Primary Examiner* — Anshu Bhatia

(57) ABSTRACT

One embodiment provides a quick-connect and rotation system for impeller coupling including: an impeller comprising: a mixer end; and a first attachment end; the first attachment end comprising a first member that is diametrically magnetized; and an motor comprising: a rotational shaft with a second attachment end comprising a second member that is diametrically magnetized; wherein the first attachment end and the second attachment end are complementary to each other; and wherein the motor imparts rotational torque, via a magnetic field between the first
(Continued)

member and the second member, on the first attachment end when the first attachment end and the second attachment end are connected.

20 Claims, 10 Drawing Sheets

(51) Int. Cl.
*F16D 1/10* (2006.01)
*B23B 31/28* (2006.01)
*B01F 27/213* (2022.01)
*B01F 35/212* (2022.01)
*B01F 35/60* (2022.01)
*B01F 35/221* (2022.01)
*B01F 35/30* (2022.01)
*B01F 101/23* (2022.01)

(52) U.S. Cl.
CPC .... *B01F 35/212* (2022.01); *B01F 35/221422* (2022.01); *B01F 35/6052* (2022.01); *B23B 31/28* (2013.01); *F16D 1/10* (2013.01); *B01F 2035/352* (2022.01); *B01F 2101/23* (2022.01); *F16D 2001/102* (2013.01)

(56) References Cited

U.S. PATENT DOCUMENTS

| | | | |
|---|---|---|---|
| 7,160,023 B2 | 1/2007 | Freude et al. | |
| 2007/0076522 A1* | 4/2007 | Engel | F16C 33/32 366/273 |
| 2010/0309746 A1* | 12/2010 | Andersson | B01F 27/11251 366/165.3 |
| 2011/0147160 A1* | 6/2011 | Kuehl | F16D 1/10 192/82 R |
| 2011/0215538 A1 | 9/2011 | Cornwell et al. | |
| 2013/0214716 A1* | 8/2013 | Barfus | B01F 7/00325 318/434 |
| 2014/0226436 A1 | 8/2014 | Baker | |
| 2015/0210012 A1* | 7/2015 | Zenere | B29C 64/393 425/162 |

FOREIGN PATENT DOCUMENTS

DE 10 2007 058188 A1 6/2009
EP 1 836 992 A1 9/2007

OTHER PUBLICATIONS

Extended EP Search Report dated Aug. 5, 2019 of corresponding European Application No. 17831809.3, 4 Pages.

\* cited by examiner

QUICK-CONNECT MIXER IMPELLER COUPLING

CROSS-REFERENCE TO RELATED APPLICATION

This application claims the benefit of U.S. Provisional Application Ser. No. 62/365,183 filed Jul. 21, 2016, which is incorporated herein by reference in its entirety.

TECHNOLOGY FIELD

The present invention relates generally to an impeller used for mixing devices in an aliquot or reaction vessel.

BACKGROUND

Clinical analyzers typically require mixing devices to mix the contents of an aliquot or reaction vessel to homogeneity to ensure correct chemistry results. In the case of a Mid-Volume Clinical Chemistry (MVCC) system, a rotating impeller is typically used. Generally, the impeller needs to be accurately positioned to avoid contacting the walls of a cuvette (i.e., the container holding the materials to be mixed).

In order to ensure that the various experiments carried out using an impeller are accurate and not contaminated, regular cleaning or replacement of impellers is needed. Generally, impellers need to be changed, on occasion, either due to damage or build-up of contaminants over time. In currently available systems, this requires, at a minimum, the use of specialized tools, as well as small, easily lost, parts. Additionally, other current solutions may require a much more involved approach, such as removing the entire mechanism during impeller replacement.

Thus, there is a need for a more efficient and simpler impeller connection type.

SUMMARY

Embodiments are directed to a quick-connect mixer impeller coupling allowing for easy cleaning and replacement.

Accordingly, an embodiment provides a quick-connect and rotation system for impeller coupling comprising: an impeller comprising: a mixer end; and a first attachment end; the first attachment end comprising a first member that is diametrically magnetized; and a motor comprising: a rotational shaft with a second attachment end comprising a second member that is diametrically magnetized; wherein the first attachment end and the second attachment end are complementary to each other; and wherein the motor imparts rotational torque, via a magnetic field between the first member and the second member, on the first attachment end when the first attachment end and the second attachment end are connected.

A further embodiment provides a quick-connect system for impeller coupling comprising: an impeller comprising: a mixer end; a first attachment end, and a first mechanical connector attached to the first attachment end; the first attachment end comprising a first member selected from the group consisting of: a magnetized member and a non-magnetized ferromagnetic member; and a motor comprising: a rotational shaft with a second attachment end; a second mechanical connector attached to the second attachment end; the second attachment end comprising a second member selected from the group consisting of: a magnetized member and a non-magnetized ferromagnetic member; wherein the first attachment end and the second attachment end are complementary to each other; and wherein the motor imparts rotational torque, via a mechanical connection between the first mechanical connector and the second mechanical connector, on the first attachment end when the first attachment end and the second attachment end are connected.

Another embodiment provides a method of manufacturing a quick-connect impeller, comprising: manufacturing an impeller comprising: a mixer end; and a first attachment end; the first attachment end comprising a first member that is diametrically magnetized; and manufacturing a motor comprising: a rotational shaft with a second attachment end comprising a second member that is diametrically magnetized; wherein the first attachment end and the second attachment end are complementary to each other; and wherein the motor imparts rotational torque, via a magnetic field between the first member and the second member, on the first attachment end when the first attachment end and the second attachment end are connected.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
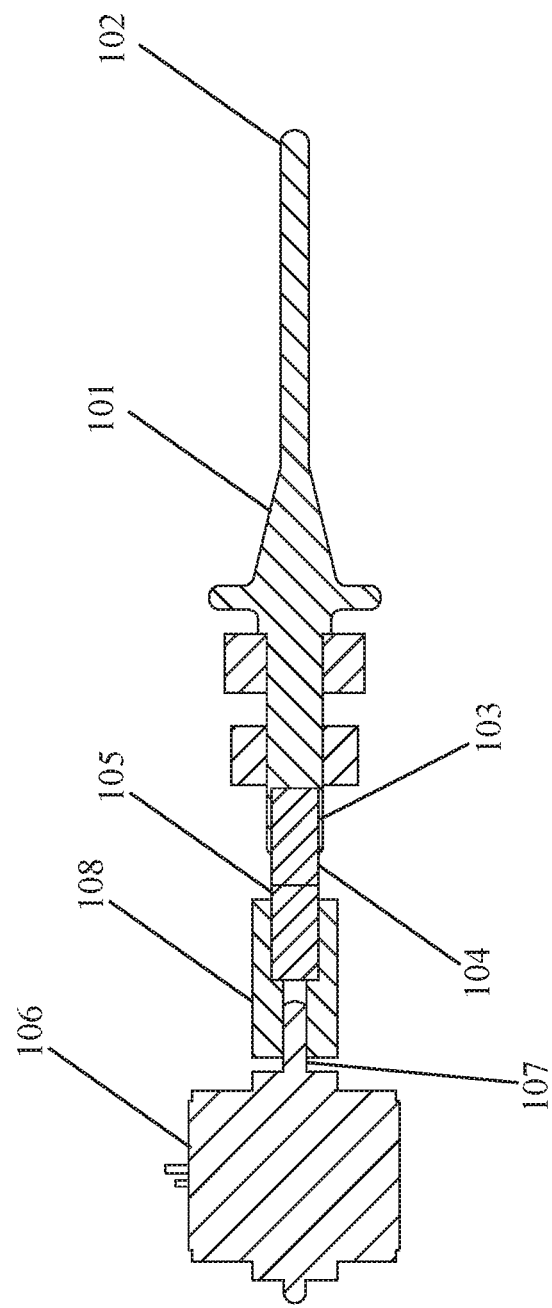
FIG. 1 is an illustrative view of an example magnetic torque transmission.

Embodiments herein are directed to a quick-connect and rotation impeller coupling system which can be used for mixing various chemicals or substances to the point of homogeneity to ensure the correct results. Advantageously, the quick-connect impeller coupling provides for easy removal (e.g., for cleaning) and/or replacement (e.g., if the impeller is at end of life).

Impellers generally need to be changed, on occasion, either due to damage or due to build-up of contaminants over time. As discussed herein, current systems require, at a minimum, the use of one or more tools, and the inclusion of small difficult to manage parts when changing an impeller.

One example of a current solution involves positioning the impeller and then twisting the impeller a quarter-turn to make a connection comprised of tight fitting shafts into their respective grooves. The shafts include a flange feature that constrains the vertical degree of freedom. The impeller is kept separable from the motor by way of a flexible coupling comprised of a simple TYGON tube glued to the shaft of the impeller. TYGON is a registered trademark of Norton Company in the United States of America.

An embodiment therefore, addresses the above shortcomings in a variety of ways as discussed herein. For example, an embodiment may establish a magnetic connection using magnets (e.g., either two magnets or a single magnet along with magnetic material), to provide the force required to constrain the impeller's vertical degree of freedom. In a further embodiment, four of the five remaining degrees of freedom may be controlled by two or more stacked bearings located on the impeller shaft. This allows the impeller to remain attached to the drive shaft of the rotating mechanism without the use of overly complicated mechanical parts (e.g., small grooves with interlocking devices and the like) as are used in current solutions, and discussed herein.

In one embodiment, the magnetic attractive force may be further utilized, such as, for example, contributing almost the entirety to the force required to assemble the impeller within a certain proximity to the mating component. Thus, using a magnetic system not only allows for easier installation and removal (e.g., tool-less removal), but also has the beneficial side effect of helping a user align and install the impeller. For example, if a user were to place the impeller within proximity to the mating component, the magnetic field of the two connecting pieces would attract each other, thereby automatically lining up the connection for a proper fit.

In another embodiment, the impeller presence and velocity may be monitored using the same magnetic system discussed above for impeller attachment. This is possible, because the magnet providing the axial coupling force (e.g., the magnet embedded inside the impeller) gives off a magnetic field that change as it rotates. Thus, an embodiment may implement a sensor device to monitor the rotations of the magnet based on the detected magnetic field. By way of non-limiting example, a Hall Effect sensor may be placed adjacent to the magnet or impeller portion housing the magnet to sense the alternating magnetic poles as the magnet rotates. Monitoring the speed of the magnetic fields, and therefore the impeller, provides valuable information on the performance of the mixer.

For example, if the requested speed (e.g., the user/system defined mixing speed) does not match the actual speed detected, an embodiment may assume an error has taken place or an issue with the sample has occurred. For example, it may be that an issue with the rotational mechanism has occurred. In one embodiment, the speed of the impeller is deduced by counting the number of pulses produced by the sensor over the mixing period. That number of pulses should match the predetermined number of pulses for that mix duration, or an embodiment can assume a failure of some type has occurred. In a further embodiment, the system may utilize the determined speed to automatically adjust or shut down the mixing process. For example, if an embodiment determines that the rotational velocity exceeds the bounds of a predetermined threshold (e.g., goes faster than a determined max speed or slower than a determined minimum speed) the system may take an action to remedy the situation.

In one embodiment, the predetermined thresholds may be based on a user entered value, or may be based on various known characteristics of the solution being mixed. For example, if the system knows the variables regarding the mixing solution, further discussed herein, it may be able to determine upper and lower bounds on the proper speed for the mixing process. Thus, if it is detected that the magnet and thereby the impeller are rotating at a speed outside of the predetermined set boundaries, an action may be taken (e.g., adjusting the speed of the rotational device/shaft, stopping the mixing process, etc.).

Not only is the vertical degree of freedom important for an impeller, but rotational torque is also a key component for the mixing process. Various embodiments are discussed herein regarding torque. Although an embodiment may utilize the magnetic system discussed herein for an impeller attachment, generally two major categories of torque transfer are discussed herein: (1) magnetic torque and (2) mechanical torque.

Thus, one embodiment involves a magnetic torque transmission system. This system may be comprised of two diametrically magnetized magnets (e.g., one attached to the motor shaft and one attached to the impeller shaft). Non-limiting illustrative examples of these are shown in the figures, for example, FIG. 1 shows a magnetic torque transmission.

As shown in FIG. 1, the impeller 101 comprises a mixer end 102 and a first attachment end 103. In some embodiments, the first attachment end 103 comprises a first member (e.g., magnetic substance) 104 that is diametrically magnetized. The diametric magnetization can allow the first member 104 to act as a magnetized member. In some embodiments, the impeller 101 is connected via the first member 104 to a motor 106. The motor (i.e., agitating device) 106 comprises a rotational shaft 107 with a second attachment end 108 comprising a second member 105 that is diametrically magnetized. The diametric magnetization can allow the second member 105 to also act as a magnetized member. The first member 104 and the second member 105 can be coupled via a magnetic field such that the first attachment end 103 and the second attachment end 108 are securely connected. In an embodiment, the strength of the magnetic field can be sufficiently weak such that the first member 104 and the second member 105 can be decoupled without using tools (i.e., by hand). In some embodiments, the motor (i.e., agitating device) imparts rotational torque via the magnetic field between the first member 104 and the second member 105 unto the impeller 101 and thus the impeller mixer end 102. In one or more additional embodiments, the first member 104 and/or second member 105 may be coated or covered in a non-ferromagnetic material (not shown). The coating or covering using a non-ferromagnetic material can allow the first member 104 and/or the second member 105 to act as a non-magnetized ferromagnetic member. The non-ferromagnetic material may help to protect the first member 104 and/or the second member 105 from chipping or being damaged when removing or replacing the impeller.

Additionally, the non-ferromagnetic material may help control the magnetic field between the first member 104 and the second member 105.

Figure 2:
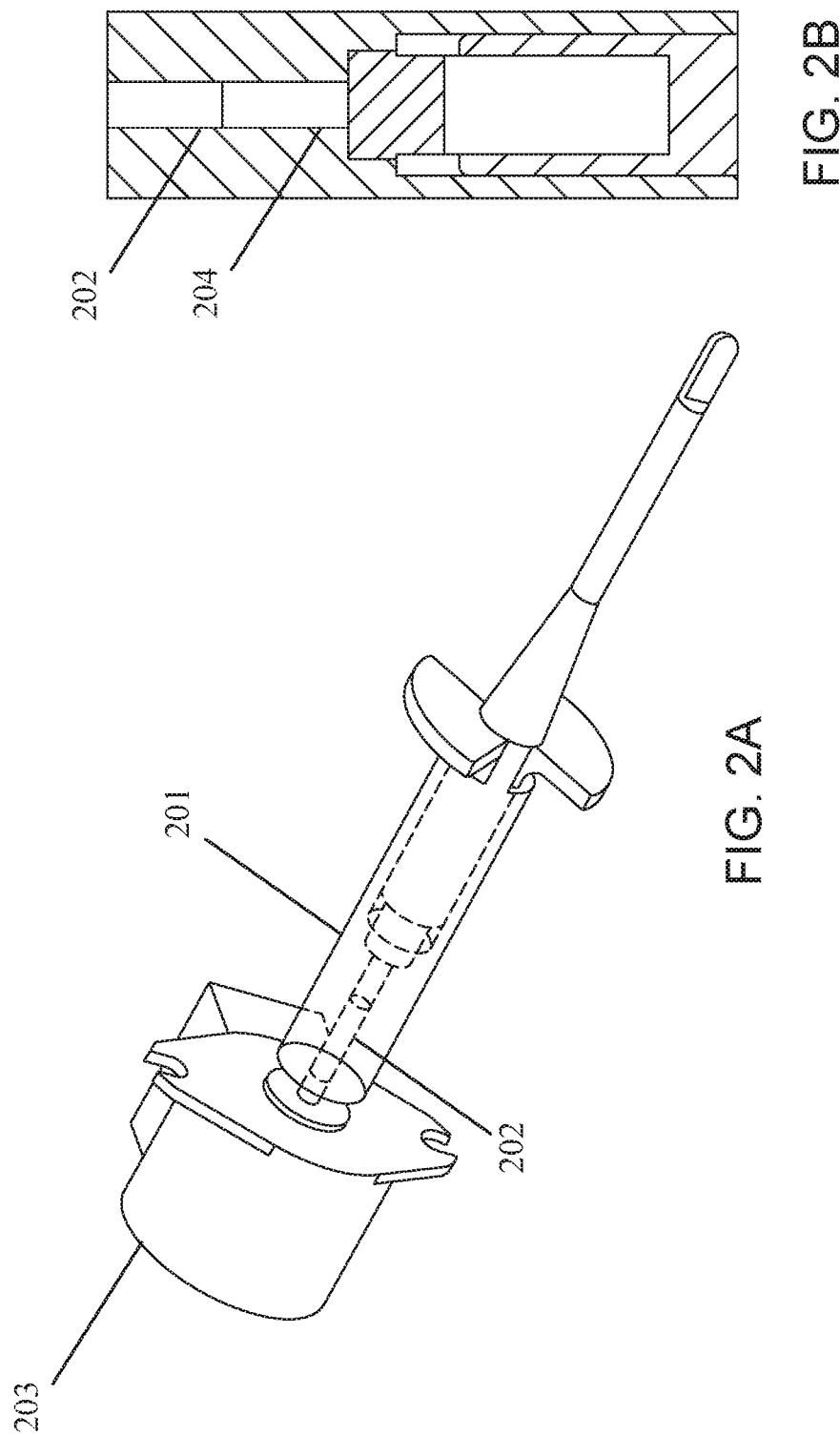
FIG. 2A is an illustrative view of an example mechanical torque transmission.
FIG. 2B is a detailed view of the mechanical connection for imparting mechanical torque.

FIGS. 2A and 2B show a mechanical torque transmission. In one non-limiting example, the impeller may comprise an outer housing 201 which is placed over the mechanical drivetrain 202 of the motor 203. In this specific non-limiting example, and as shown in FIG. 2B, the drivetrain 202 of the motor 203 is attracted to a portion of the impeller 204. As discussed herein, this may be accomplished by using one or more magnetic objects (e.g., 202 and 204) to attract the impeller 203 and the drivetrain 202 to each other. However, the actual rotation of the impeller is created via mechanical torque. For example, outer housing 201 may have an inner cavity which has a geometric shape designed to correspond to the drivetrain (e.g., a hexagonal).

Figure 3:
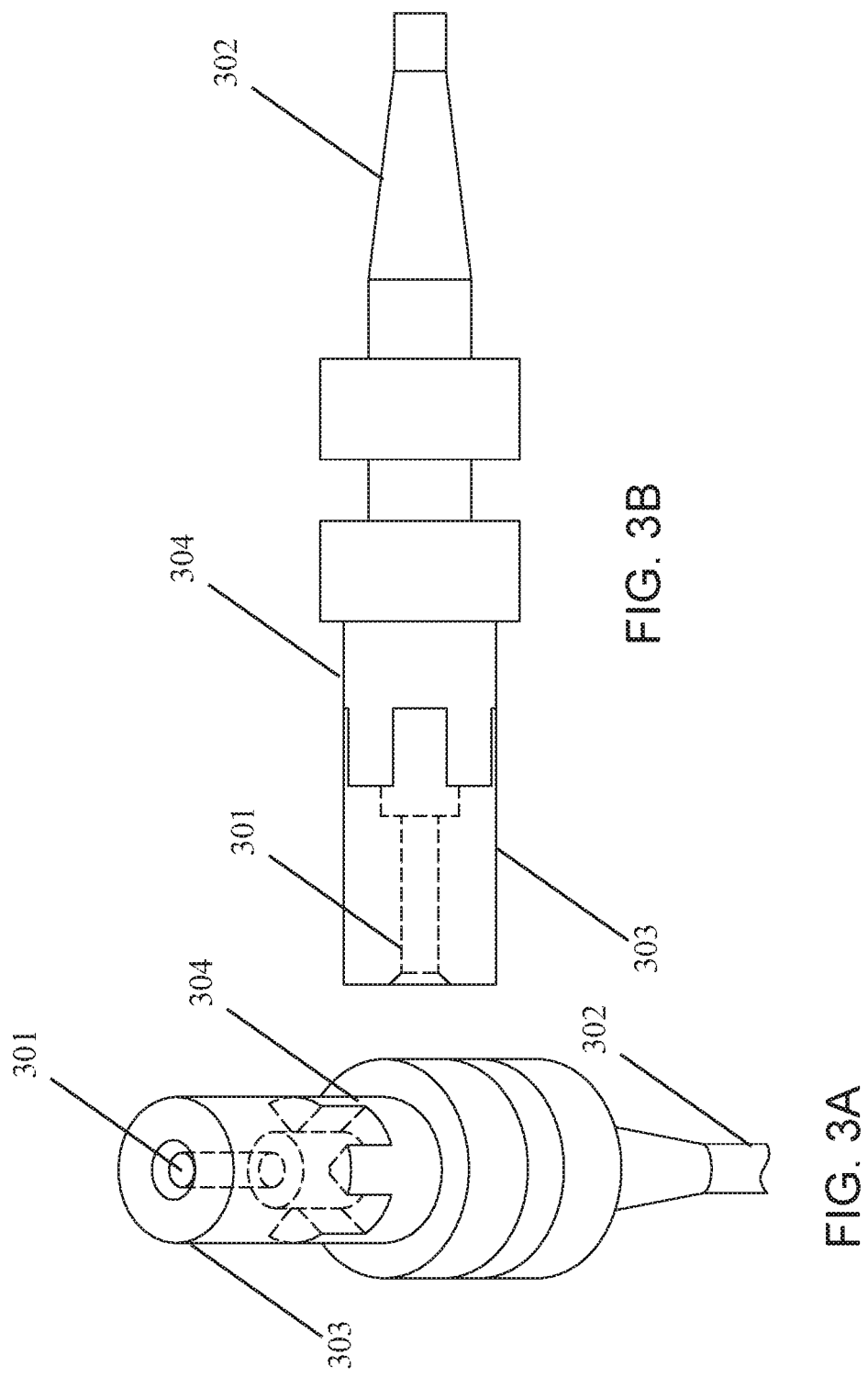
FIG. 3A is another illustrative view of an example mechanical torque transmission.
FIG. 3B is another illustrative view of an example mechanical torque transmission.

FIGS. 3A and 3B show an alternative embodiment of imparting mechanical torque onto an impeller. In this specific non-limiting example, the drivetrain 301 and the impeller 302 are attracted to each other in a manner similar to those discussed herein. The attraction forces cause a first housing 303 associated with the motor (not shown) to interlock with a second housing 304 associated with the impeller. As shown in FIG. 3A, the first housing 303 and the second housing 304 have four protrusions that are designed to be complementary to each other and form a connection capable of imparting torque from the drivetrain 301 to the impeller 302.

Figure 4:
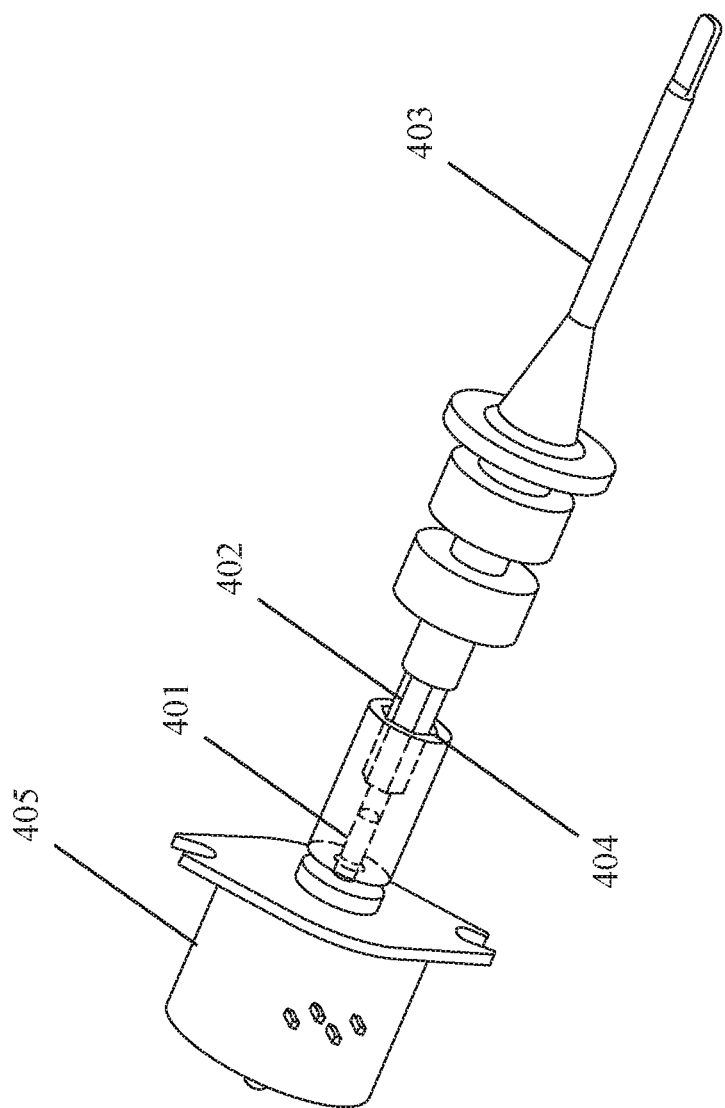
FIG. 4 is another illustrative view of an example mechanical torque transmission.

Referring to FIG. 4, another embodiment comprising a mechanical torque is shown. In this non-limiting embodiment, a drivetrain 401 is attracted to a hexagonal portion 402 of the impeller 403. As shown, the portion 402 is drawn inside a housing 404 of the motor 405. As shown, in some embodiments, the housing 404 may have a hexagonal recess configured to receive the hexagonal portion 402 thus allowing the motor to impart rotational torque via the housing 404 to the impeller 403. It should be understood that a hexagonal shape of the first member and second member is only one of the multiple possible shapes to allow for mechanical torque, and that any known or feasible shape (e.g., square, polygon, heptagon, octagon, etc.) may be utilized in alternative embodiments.

With regard to the magnetic torque transmission, in one embodiment, when the system is at rest, the north pole of the motor aligns with the south pole of the impeller. Then, when the north pole on the motor side is rotated (e.g., the system is turned on or started), the south pole on the impeller side will follow as they are diametrically magnetic. Thus, an embodiment provides the advantage of using an innovative flexible coupling design with: a miniature size, insensitivity to alignment and wear, easily user-replaceable, and low cost.

In one embodiment, when the magnets are used to impart torque, the magnets may have a plurality of sides (e.g., be pentagonal, hexagonal, octagonal, decagonal, etc.) The hexagonal configuration allows the impeller to be inserted in nearly any rotational orientation whereas, for example, a rectangular may only allow insertion in increments of 180 degrees.

In another embodiment, a mechanical torque transmission is used. However, although the torque is derived mechanically, an embodiment may still utilize one or more diametrically or axially magnetized magnets and/or a magnetic material (e.g., placed in the component opposite the component containing the magnet) to couple the impeller and drive shaft (e.g., lock the impeller's vertical degree of freedom).

Accordingly, an embodiment provides a system wherein, an impeller, used to mix samples with a chemical reagent in a diagnostic analyzer, is magnetically coupled to a motor for quick-disconnect functionality. An embodiment may further use those same magnets in conjunction with a Hall Effect sensor, or the like, to detect the presence and velocity of the impeller. A further embodiment may use two (2) diametrically magnetic magnets to magnetically transmit torque between the impeller and the motor. Additionally or alternatively, an embodiment may use either a diametric or an axially magnetized magnet accompanied by an interlocking mechanical key feature to transmit torque mechanically while coupled magnetically.

In addition to the aforementioned improvements, the embodiments described herein are generally cheaper to manufacture than the current solutions. This is due to the fact that the level of accuracy required by the features in the design, (e.g., requiring removal of a cover with a tool just for access; being overtly difficult to assemble; having more risk ensuring sufficient connection) is achieved between the motor rotor and impeller assembly; and the flexible coupling's only function is to transmit torque and sensing.

However, in an embodiment, the magnet allows for the constraint on the vertical degree of freedom to be overridden by a force applied that is greater than that of the magnetic force (e.g., a user's grip). Once the vertical degree is unconstrained, the impeller is free to be removed. The force required to override a magnetic coupling device, thus separating the first member and second member, may be easily generated without the use of a tool. This simplicity qualifies a wide range of people with varying physical characteristics, knowledge, and experience to perform the impeller replacement operation. The simplicity allows the connection to be made without visibility of the motor coupling. Additionally or alternatively, one or both of the magnets may be electro magnets and thus allowing for removal of the impeller with a simple flick of switch and the removal of power.

Due to the value that the mixer brings to the overall functionality of the instrument, effort was made to minimize customer downtime by providing a customer replaceable solution. This, in turn, saves manufacturer money, as it is not required to pay to send a service technician out to the customer for any repairs to the impeller. It also saves money in preventing a lost customer due to downtime frustration and monetary productivity losses the customer would experience in this situation.

Mixing the contents of the cuvette is a critical function of the fluidics system to ensure the most accurate chemical results are obtained. Generally, mixing occurs in a dilution cuvette, which ensures that a primary sample is adequately mixed with a diluent. This mixing should also occur in a reaction cuvette thereby ensuring that the current sample and reagents are thoroughly mixed allowing for a proper chemical reaction.

Typically, as discussed herein, a Mid-Volume Clinical Chemistry (MVCC) system uses a rotating impeller to mix the contents of a cuvette. Use of the impeller provides a relatively simple and well controlled method for mixing. Like other contact-mixing technologies, the impeller must generally be washed between tests to minimize contaminate carryover.

Figure 5:
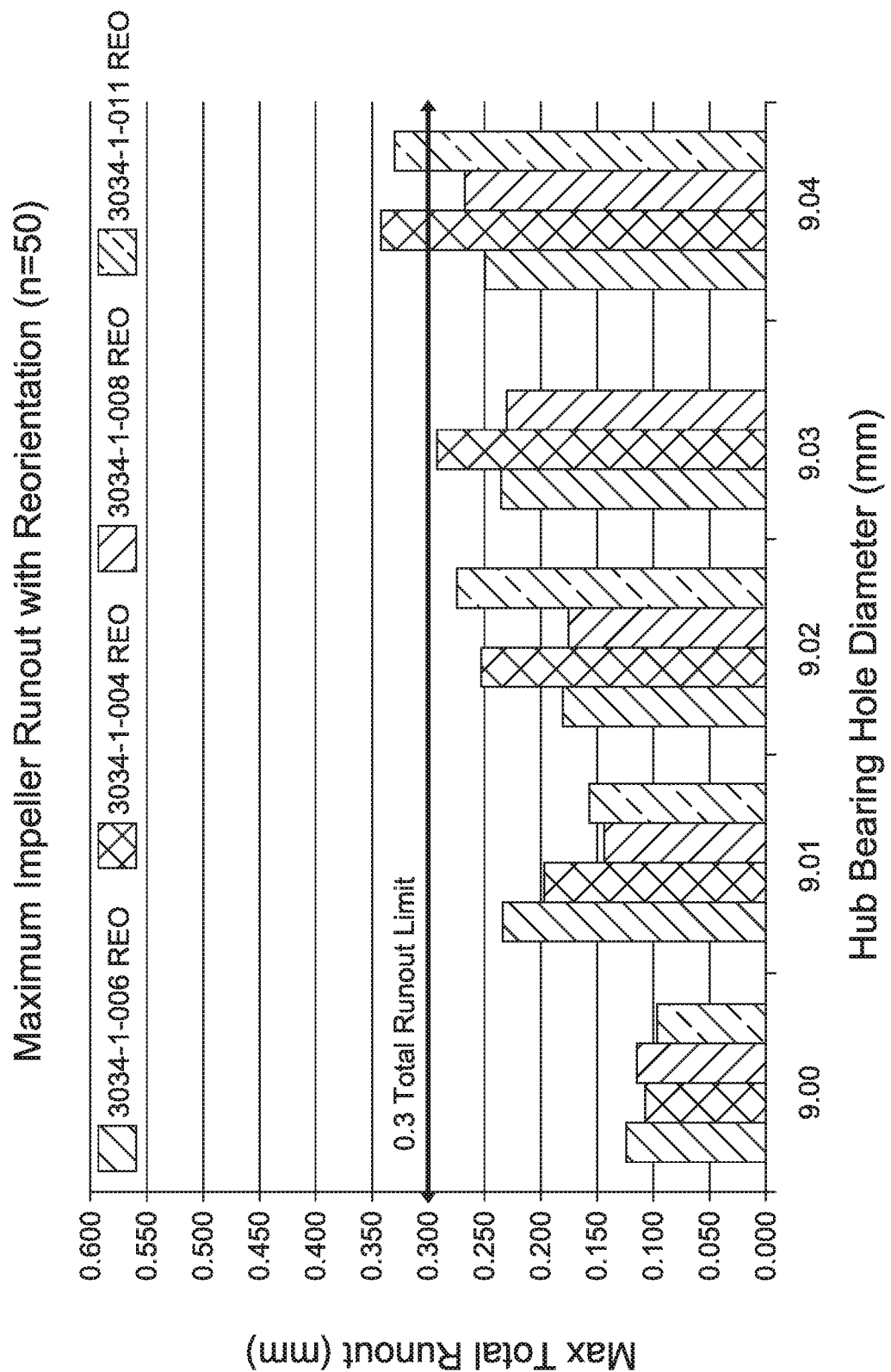
FIG. 5 is an example graphical representation of an impeller run vs. hub bearing hole diameter.

In another embodiment, stacked bearings may be required as a part of the assembly in order to achieve the total runout specification (e.g., of 0.3 mm), driven by the tight resulting clearance between the cuvette sidewall and required impeller size. Thus, in an embodiment, a bearing with tight radial play may be selected due to the fact that the bearing was operating without a pre-load. The hub bearing hole diameter's effect on impeller runout was characterized using a CCD micrometer. Reorientation of the hub was required during this testing due to the fact that the impeller runout governance shifts to the coupling component when the bearing hole diameter exceeds the controlling limit. FIG. 5 depicts a non-limiting graphical representation of the maximum impeller runout with reorientation (n=50).

In a further embodiment, a customer replaceable solution is included. Due to the value that the mixer brings to the overall functionality of the instrument, effort was made to minimize customer downtime by providing a customer replaceable solution. An embodiment achieves this by using a magnetic coupling system and balancing the corresponding force needed to couple sufficiently with the need to replace the impeller with ease. The magnet's attractive force in conjunction with the orientation friendly shape (e.g., hexagonal shape) allows the impeller to almost fully position itself within close proximity to the coupling. Installation and removal must occur when the arm is located above the wash station.

Figures 6A, 6B:
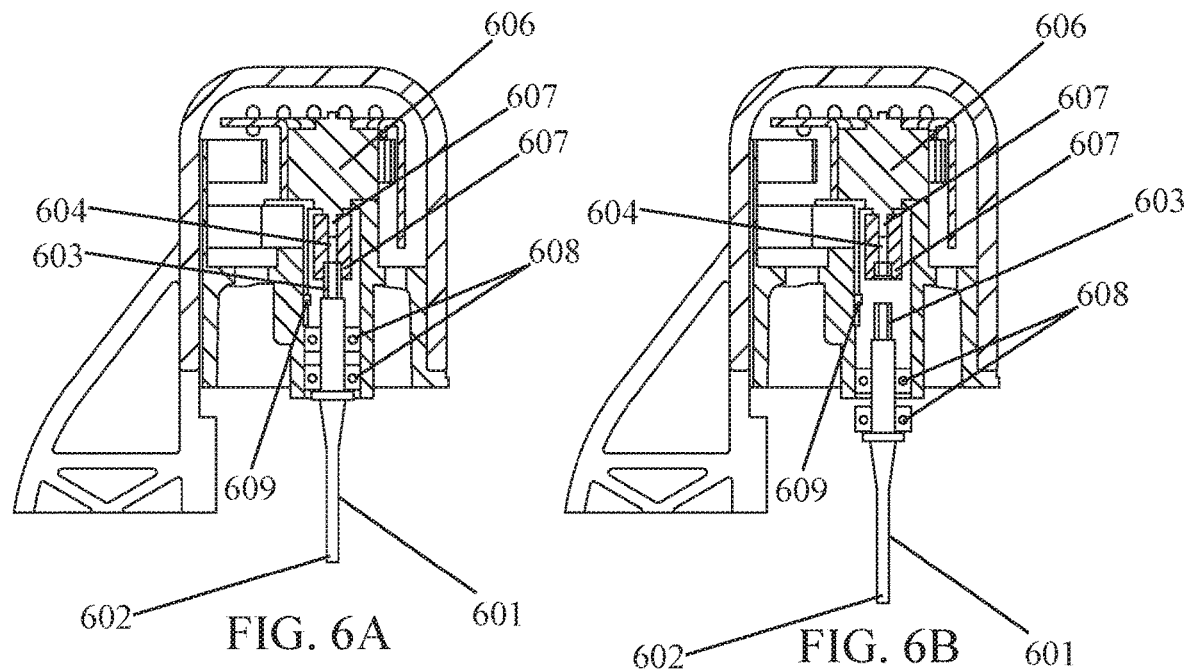
FIG. 6A is an example illustration of impeller coupling and replacement.
FIG. 6B is another example illustration of impeller coupling and replacement.
Figures 6C, 6D:
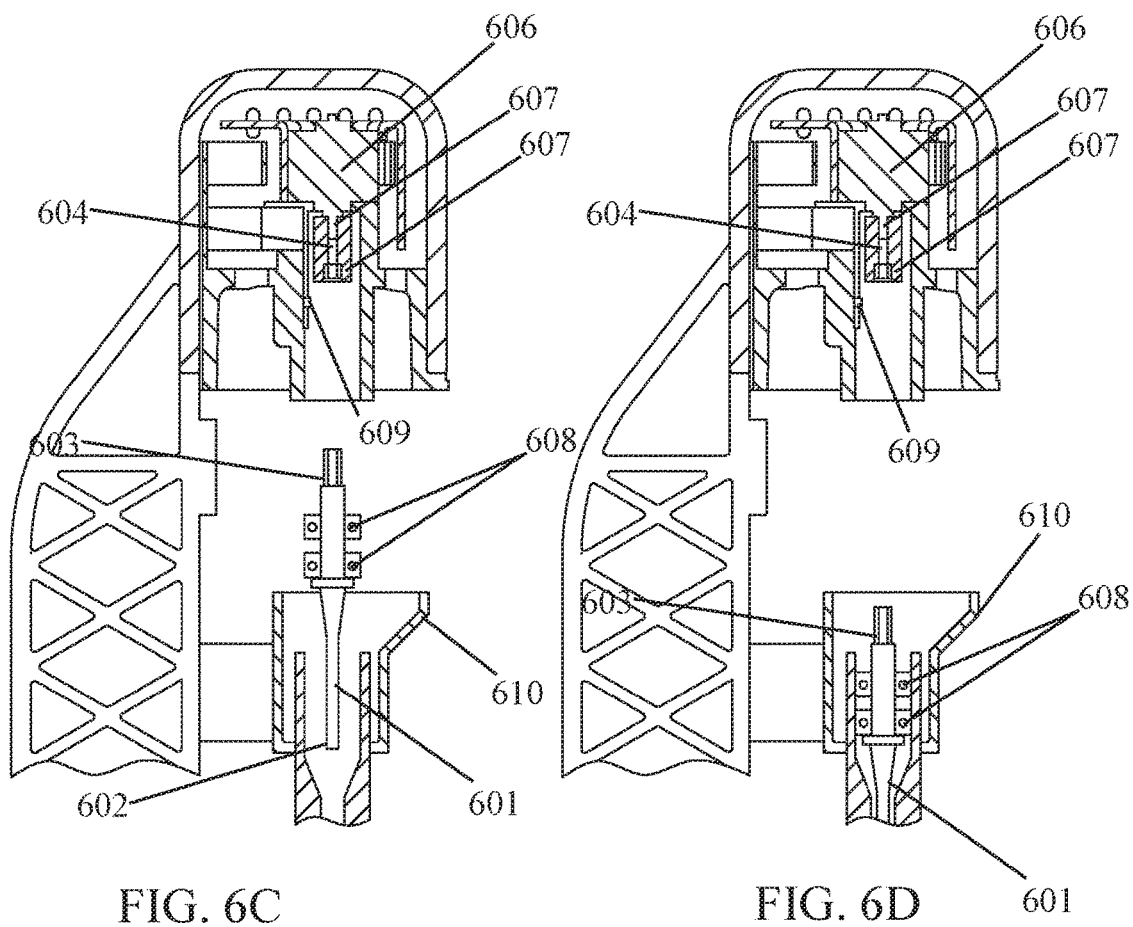
FIG. 6C is another example illustration of impeller coupling and replacement.
FIG. 6D is another example illustration of impeller coupling and replacement.

An illustrated example of impeller coupling and replacement is shown in FIGS. 6A-6B. As shown, an impeller 601, which as discussed herein comprises a mixer end 602 and a first attachment end 603. In some embodiments, the first attachment end 603 comprises a first member (e.g., magnetic substance) 604 that is diametrically magnetized. In some embodiments, the impeller 601 is connected via the first member 604 to a motor 606. The motor (i.e., agitating device) 606 comprises a rotational shaft (not shown) with a second attachment end comprising a second member 607 that is diametrically magnetized. In some embodiments, the motor (i.e., agitating device) 606 imparts rotational torque via a magnetic field between the first member and the second member unto the impeller 601 and thus the impeller mixer end 602.

In one or more additional embodiments, such as that shown in FIGS. 4 and 6A-6D, may involve a mechanical means of torque generation. As shown, the first attachment end 603 is hexagonal in shape, and as discussed herein, a housing 605 may contain a complementary cavity to securely receive the hexagonal first attachment. Due to their complementary shape, rotational torque may be passed from the motor 606 to the impeller 601 via the interlocking of the first attachment end 603 and the housing 605. In some embodiments, and as further discussed with respect to FIG. 7, one or more bearings 608 and rotational sensors 609 are discussed herein.

As shown in the progression of FIGS. 6A-6B, the one or more bearings 608 may, in some embodiments, be attached to the impeller 601. Additionally, in some embodiments, the one or more bearings 608 may restrict horizontal movement, roll movement, and pitch movement of the impeller 601. Additionally, as shown in the progression of FIGS. 6A-6B, the impeller 601 may be removed or released and decoupled from the second member 607 (e.g., magnetic or mechanical torque device). In some embodiments, when the impeller is removed, it may fall into or be placed in a wash basin 610 for cleaning.

Figure 7:
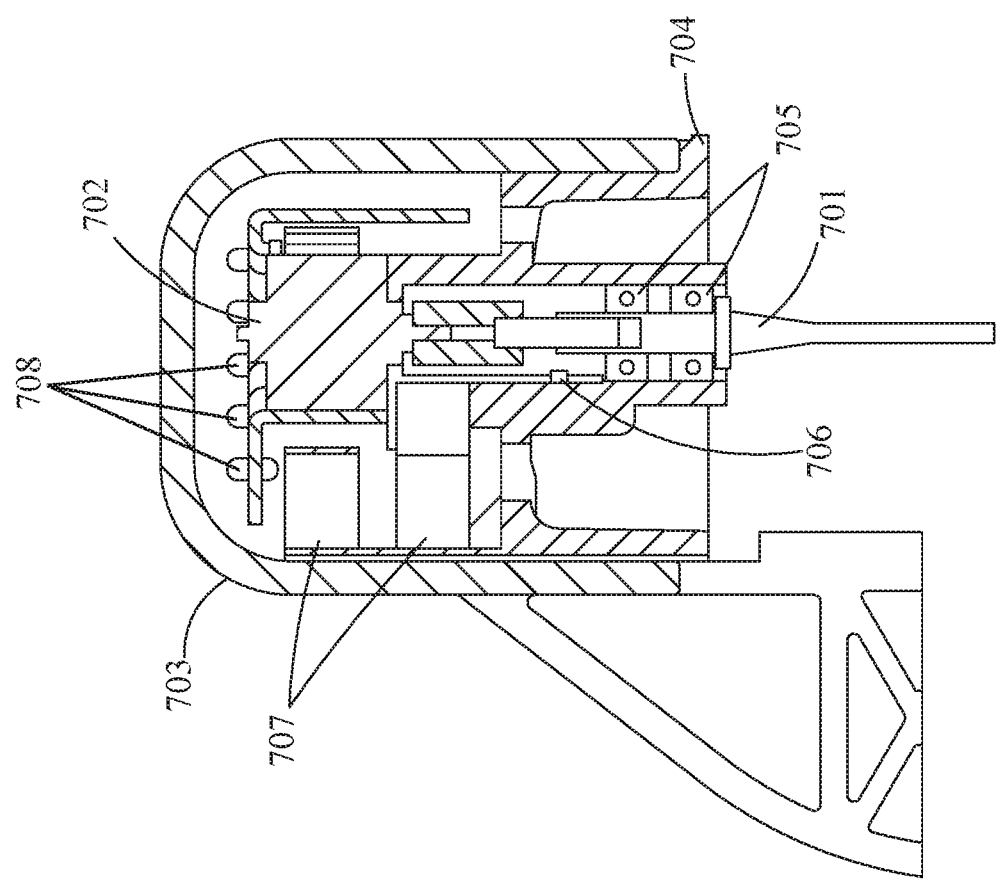
FIG. 7 is an illustrative example of an arm assembly cross-sectional view.

Referring to FIG. 7, an embodiment may include a hub to allow the impeller 701 to connect to the motor assembly 702 and housing (i.e., arm) 703. In at least one embodiment, a hub 704 may mate with the housing via a tapered fit which allows for self-centering functionality. The hub 704 may also provide a housing for the one or more bearings 705 and rotational sensors 706 discussed herein. In some embodiments, the one or more bearings 705 may restrict horizontal movement, roll movement, and pitch movement. In one embodiment, the hub may also provide an impeller adjustability. The impeller may be adjusted from about +0.01 mm to about +1.5 mm and about −0.01 mm to −1.5 mm. Similar to the arm, in one embodiment, the hub may also be constructed out of plastic injection molding due to the low cost and light weight qualities of the material. In a further embodiment, a bearing hole (not shown) may be included. The bearing hole may also require a secondary machining operation to achieve the precision necessary to balance customer replace-ability and impeller runout control (e.g., a precision level of about 1 micron to about 20 microns).

In one embodiment, features on the housing 703 may include: ventilation for motor temperature control 708, a slot formed by ribs for sensor board slip fit, ribs for flex cable 707 routing and protection, and additional mounting holes for larger motors (not shown). In one embodiment, a flexible printed circuit board (PCB) (not shown) is designed to provide power from the DCM to the mixing stepper motor and rotational sensor 706 (e.g., Hall Effect sensor). It is designed to be a flexible interconnect PCB that will undergo repetitive flexing motion along one direction. In one embodiment, in order to reduce the possibility of EMC emissions from the board, all electrical traces (step motor power and sensor lines) may be sandwiched between two 50% copper etched grounded layers, creating the properties of a faraday cage surrounding the traces that absorb the majority of electro-magnetic fields generated by the PCB.

Figure 8B:
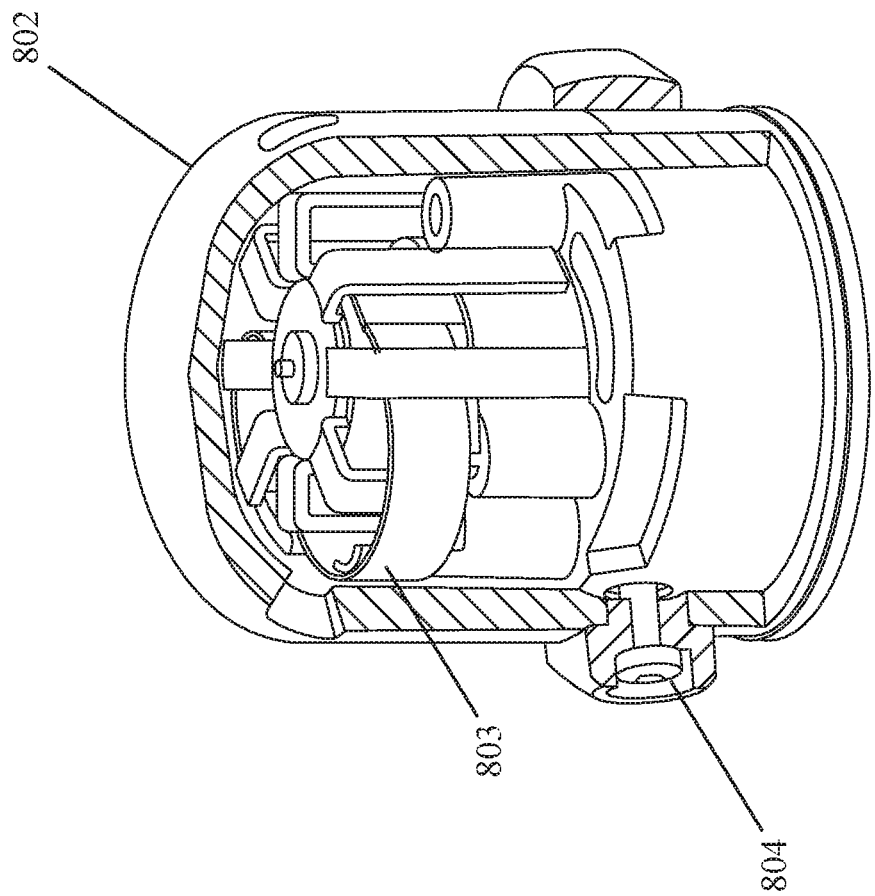
FIGS. 8A and 8B are an illustrative example of a stand-alone mix hub and mix hub in the installed position.
Figure 8A:
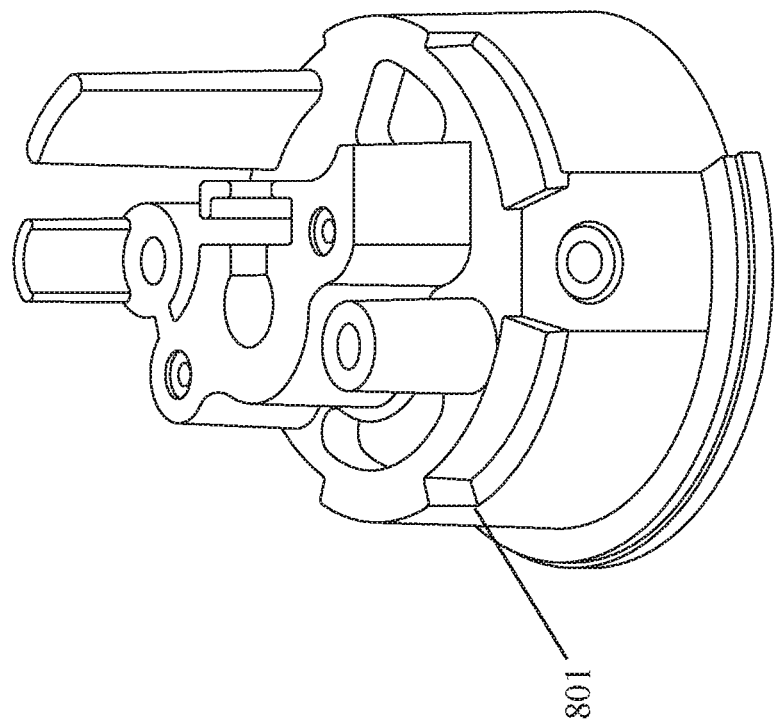

FIGS. 8A and 8B illustrate the interior of a potential hub 801 and a housing 802 to enclose the hub. Within the housing, and attached to the hub may be a flexible PCB 803. Additionally or alternatively, full copper shielding and silver inked shielding may be used (not shown). Additionally, as further discussed herein, the housing may have a clamp 804, which is used to lock and/or control the orientation of the hub within the housing. As discussed with regard to FIG. 10, the hub can be rotated within the housing and locked in place via the clamp 804.

Referring back to FIG. 7, when the rotational sensor 706 is present, an embodiment may be able to detect the presence of the impeller 701 and/or the velocity of the impeller may be monitored. Utilizing the same magnet system that provides the axial (e.g., 104 and 105 of FIG. 1) and a sensor (e.g., a Hall Effect sensor) placed adjacent to the magnet, an embodiment may be able to sense the alternating magnetic poles.

Figure 9:
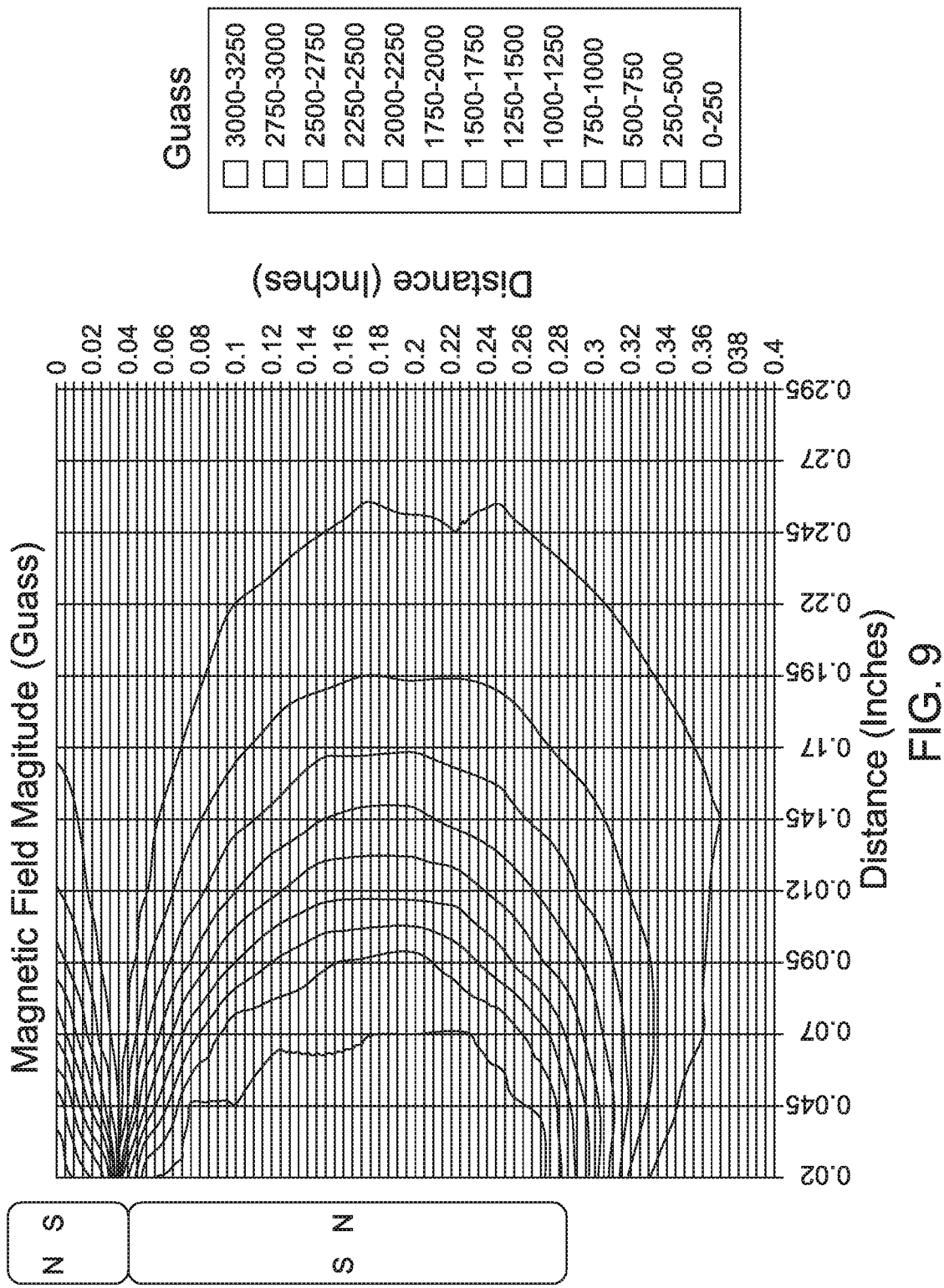
FIG. 9 is a graphical representation of the magnetic field of a sensor.

In some embodiments, the sensor selected has a wide magnetic sensitivity range providing location flexibility to the sensor relative to the magnet with robustness to outside magnetic influences. In some embodiments, the sensitivity may be adjusted without major electrical redesign. Characterizing the magnetic field strength over distance as shown in FIG. 9 determines an optimal sensor position and operating window for this configuration. In some embodiments, each impeller may contain a di-axially polarized magnet which creates a magnetic field with alternating north/south poles when rotated, thus allowing an embodiment to monitor the rotational speed of the impeller. Monitoring the speed provides valuable information on the performance of the mixer. If the requested speed does not match the actual speed recorded, it is indicative of an issue with the mechanism. In an embodiment, the motor can be disabled if the rotational velocities of either the motor and/or the impeller exceed a predetermined threshold. Alternately, the motor can be disabled if the rotational velocities of either the motor and/or the impeller drop below a predetermined threshold. In either scenario, disabling the motor can disable the rotational torque imparted by the motor. Alternately, the rotational torque can be disabled by a disjunction of the magnetic fields coupling the first member and second member, leading to a decoupling.

The sensor may respond to a north pole and generates a digital active low electrical signal to the digital control module (DCM) controlling the mixer's motor. Conversely, the sensor may generate an active high signal when it senses a south pole. Thus, as the paddle spins, a series of electrical pulses are generated due to the alternating field and are sent to the DCM. The DCM counts the number of low to high digital transitions during the mix. This count can be used to determine the total number of rotations made by the mixer. After the mix, the DCM sends the transition count to the host software. The host software checks to see if the number of transitions matches the expected value. If the count equals zero then the host sends an error to the user that a paddle is not present. If the count is between zero and the expected value, a different error may be generated indicating a defect is present in the mixer.

In one embodiment, the rotational sensor may use standard transistor-transistor logic (TTL), which can directly interface to a DCM and can operate using 3 to 24 VDC (e.g., 5 VDC). This sensor may also have a diverse range of magnetic sensitivity selections, thus allowing for more flexibility when designing the placement of the sensor relative to the magnet.

Figure 10C:
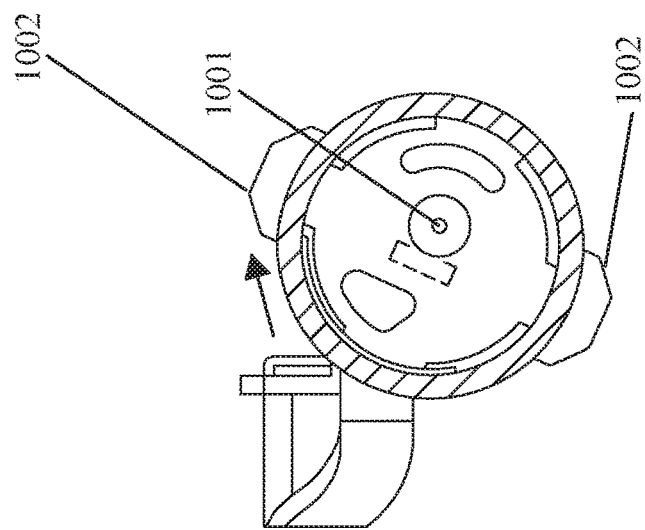
FIGS. 10A-10C are illustrative examples of a mixer impeller horizontal alignment mechanism.
Figure 10B:
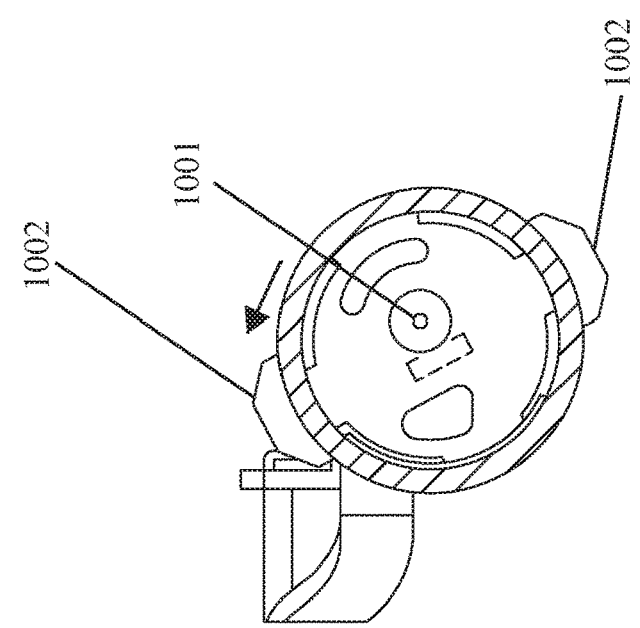
Figure 10A:
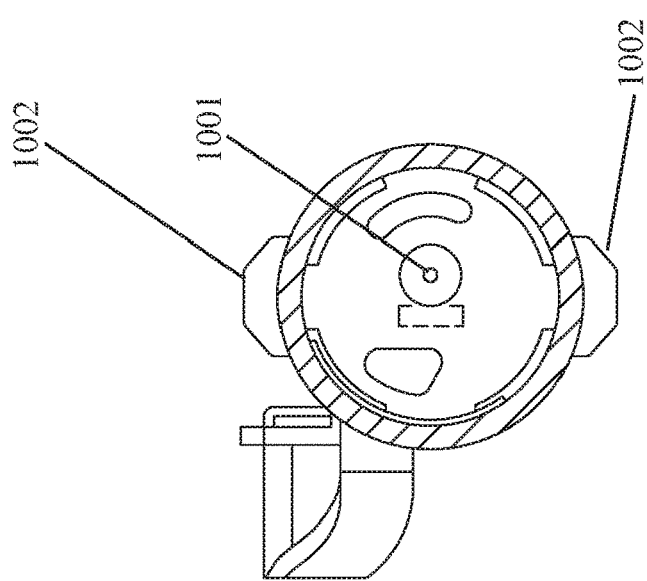

Referring to FIGS. 10A-10C, in some embodiments, the motor (not shown) may sit eccentric to the hub center for easy impeller 1001 alignment adjustment. This is visible, as the impeller 1001 would be required to be located in the central axis of the motor, but is not central to the hub, as shown in FIGS. 10A-10C. Thus, once the clamps 1002 (i.e., 804 of FIG. 8) that fix the position are loosened, the hub is able to rotate (i.e., as indicated by the arrows in FIGS. 10B and 10C. Due to the motor sitting eccentric to the hub, the rotation of the hub within the housing results in translational movement of the impeller 1001 in the direction that requires the best precision.

Some radial movement may also result. However, the effect is negligible due to the tolerance in that direction. Gear teeth (not shown) are present to provide fine adjustment and resolution. In one embodiment, the adjustment to the impeller can be from about 0.01 mm to about 0.2 mm. Based on a degree of turning freedom, an embodiment may be able to determine the max travel of the impeller. By way of non-limiting example, a turning freedom of plus or minus 26° generally translates to plus or minus 1.3 mm along the x-axis.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A quick-connect and rotation system for impeller coupling comprising:
an impeller comprising:
a mixer end, and
a first attachment end,
the first attachment end comprising a first member that is diametrically magnetized; and
a motor comprising:
a rotational shaft with a second attachment end comprising a second member that is diametrically magnetized;
wherein the first attachment end and the second attachment end are complementary to each other,
wherein the first attachment end directly contacts the second attachment end when the first attachment end and the second attachment end are connected, and
wherein the motor imparts rotational torque, via a magnetic field between the first member and the second member, on the first attachment end when the first attachment end and the second attachment end are connected.

2. The system of claim 1, wherein the first attachment end and the second attachment end are securely connected via the magnetic field between the first member and the second member.

3. The system of claim 2, wherein the magnetic field between the first member and the second member can be decoupled without using tools.

4. The system of claim 1, wherein each of the first member and second member are hexagonally shaped.

5. The system of claim 1, further comprising a velocity sensor, wherein the velocity sensor monitors rotational velocity of at least one of: the motor and the impeller.

6. The system of claim 5, wherein the velocity sensor comprises a Hall Effect sensor.

7. The system of claim 5, wherein the rotational torque imparted by the motor is disabled if the rotational velocity of the at least one of: the motor and the impeller exceeds a predetermined threshold.

8. The system of claim 5, wherein the rotational torque imparted by the motor is disabled if the rotational velocity of the at least one of: the motor and the impeller drops below a predetermined threshold.

9. The system of claim 1, wherein at least one of: the first member and the second member are covered with a non-ferromagnetic material.

10. The system of claim 1, wherein the electromagnetic field between the first member and the second member restricts a vertical degree of freedom of the impeller; and
wherein two stacked bearings restrict horizontal movement, roll movement, and pitch movement.

11. A quick-connect system for impeller coupling comprising:
an impeller comprising:
a mixer end,
a first attachment end, and
a first mechanical connector attached to the first attachment end,
the first attachment end comprising a first member selected from the group consisting of: a magnetized member and a non-magnetized ferromagnetic member; and
a motor comprising:
a rotational shaft with a second attachment end,
a second mechanical connector attached to the second attachment end,
the second attachment end comprising a second member selected from the group consisting of: a magnetized member and a non-magnetized ferromagnetic member;
wherein the first attachment end and the second attachment end are complementary to each other, wherein the first attachment end directly contacts the second attachment end when the first attachment end and the second attachment end are connected, and wherein the motor imparts rotational torque, via a mechanical connection between the first mechanical connector and the second mechanical connector, on the first attachment end when the first attachment end and the second attachment end are connected.

12. The system of claim 11, wherein at least one of the first member and the second member comprises a magnetized member; and wherein the first attachment end and the second attachment end are securely connected via the magnetic field between the first member and the second member.

13. The system of claim 12, wherein the magnetic field between the first member and the second member can be decoupled without using tools.

14. The system of claim 11, wherein the magnetized member is at least one of: diametrically magnetized and axially magnetized.

15. The system of claim 11, further comprising a velocity sensor, wherein the velocity sensor monitors rotational velocity of at least one of: the motor and the impeller.

16. The system of claim 15, wherein at least one of the first member and the second member comprises a magnetized member; and wherein the velocity sensor comprises a Hall Effect sensor.

17. The system of claim 15, wherein the rotational torque imparted by the motor is disabled if the rotational velocity of the at least one of: the motor and the impeller fulfills at least one of: exceeding an upper bound of a predetermined threshold and falling below a lower bound of a predetermined threshold.

18. The system of claim 11, wherein at least one of: the first member and the second member are covered with a non-ferromagnetic material.

19. The system of claim 11, wherein the electromagnetic field between the first member and the second member restricts a vertical degree of freedom of the impeller; and wherein two stacked bearings restrict horizontal movement, roll movement, and pitch movement.

20. A method of manufacturing a quick-connect impeller, comprising:

manufacturing an impeller comprising:
a mixer end, and
a first attachment end,
the first attachment end comprising a first member that is diametrically magnetized; and manufacturing a motor comprising:
a rotational shaft with a second attachment end comprising a second member that is diametrically magnetized;

wherein the first attachment end and the second attachment end are complementary to each other, wherein the first attachment end directly contacts the second attachment end when the first attachment end and the second attachment end are connected, and wherein the motor imparts rotational torque, via a magnetic field between the first member and the second member, on the first attachment end when the first attachment end and the second attachment end are connected.

* * * * *